Patented Mar. 6, 1945

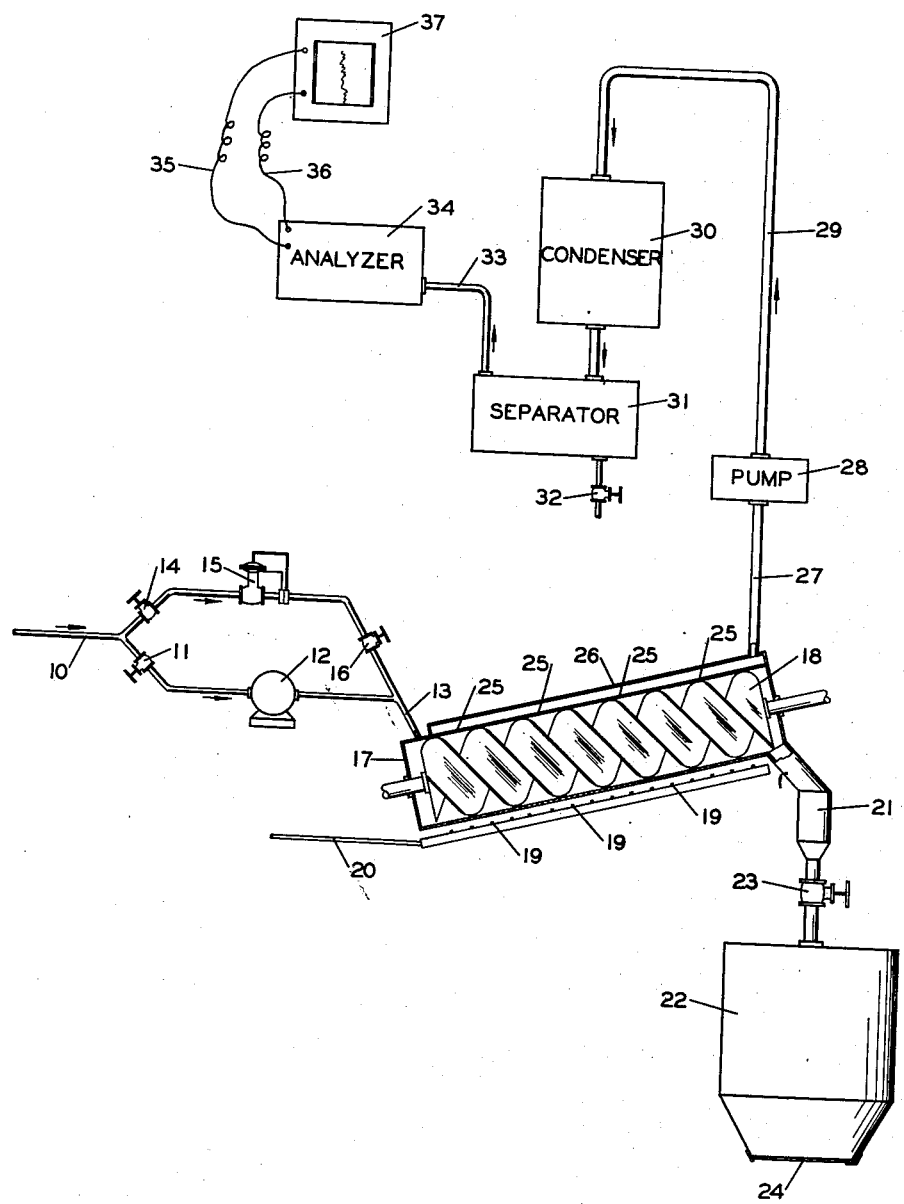

2,370,817

UNITED STATES PATENT OFFICE 2,370,817

METHOD AND APPARATUS FOR TREATING DRILLING FLUID

James J. Shanley, Bartlesville, Okla., assignor to Phillips Petroleum Company, a corporation of Delaware Application February 13, 1941, Serial No. 378,824

5 Claims. (Cl. 73—23)

This invention relates to improvements in methods and apparatus for extracting gases from drilling mud.

The analysis of the gases associated with drilling mud as it emerges from the drill hole furnishes information relative to the subsurface formations which is of use to the driller and to the geologist. These gases are dissolved, occluded, or entrained in the drilling mud and may be released therefrom by subjecting the mud to agitation, heat, vacuum, or a combination of these factors. A method of determining the amount of combustible gases in the drilling mud which is in use at the present time comprises subjecting a stream of the drilling mud to suction to collect gases evolved in dropping the pressure on the mud to atmospheric. The gas collected by this means is continuously passed through a gas detector which gives a continuous record of the amount of gas evolved from the drilling mud. This method is effective for the determination of the gas in excess of that which the mud can hold in a dissolved or absorbed state at atmospheric pressure or pressures slightly less than atmospheric. However, this method is subject to the disadvantage that it is not applicable to the detection of the gas contained in the drilling mud in the dissolved or absorbed condition.

The copending patent application of Richard L. Doan, Serial No. 341,031, filed June 17, 1940, discloses a method in which isolated samples of the drilling mud are heated in a closed vessel until a superatmospheric pressure is built up. The pressure on the vessel is then released allowing the gases and steam to flash off into a receptacle from which the gases are withdrawn for analysis. The copending patent application of Francis W. Crawford, Serial No. 341,047, filed June 17, 1940, discloses a method in which a sample of the drilling mud is heated under vacuum to evolve the dissolved and occluded gases. The steam evolved along with the gases is condensed in a condenser. In both methods the samples of the gases evolved are tested in a gas analyzing device. These methods furnish means for the accurate determination of the quantity of gases associated with the drilling mud. A disadvantage of the methods employing heat and vacuum is that they necessitate the collection of numerous samples of the drilling mud and the testing of these samples either at the well or in the laboratory is a time-consuming but very accurate analysis. Considerable time is required for heating the samples and preparing the apparatus for the next sample. To be of use to the driller, the analysis of samples must be carried out as the drilling proceeds. With modern methods of rotary drilling, the bit may travel several feet during the interval between the taking of samples. Therefore, it will be readily apparent to those skilled in the art that continuous extraction of the gas is desirable for analysis during the drilling operations.

An object of this invention is to provide a method and apparatus for the continuous extraction of gases from drilling mud.

Another object of this invention is to provide apparatus which will extract adsorbed and dissolved gases from drilling mud as well as the occluded and entrained gases.

A further object of this invention is to provide apparatus for continuously extracting gases from drilling mud under the influence of heat and vacuum.

Other objects and advantages of this invention will be apparent from the following detailed description and the accompanying drawing which is a diagrammatic elevation, partly in vertical section, of a preferred embodiment of apparatus of my invention.

In accordance with this invention a continuous sample stream of the drilling mud is passed to a retort where it is heated under vacuum to thoroughly strip the gases from the mud. The gases and water vapor evolved are collected and passed to a condenser which condenses the water. Uncondensed gases are then analyzed for hydrocarbons.

With reference to the drawing, the stream of sample is taken from the discharge pipe on the drilling rig through the pipe 10 and passed through the valve 11 and metering pump 12 into the pipe 13. If desired the stream of mud may be passed through valve 14, the rate-of-flow controller 15, and through the valve 16 into the pipe 13. From the pipe 13 the sample stream is discharged into the shell 17 of a still or retort. The retort includes a scraping means 18 which may be in the form of a helical conveyor as illustrated in the drawing, although any other well known form of retort and scraper may be used. The helical scraper is turned by any suitable means, not shown in the drawing. Sufficient heat to effect rapid vaporization of the water and drying of the residual solids is furnished by the burners 19 to which fuel is supplied through the pipe 20. The helical conveyor or scraper 18 agitates the drilling mud during the extraction period and carries the solid residue along the retort to the discharge chute 21. From the chute the residue is admitted to a receptacle 22 through the valve 23. The receptacle 22 may be emptied through an opening in the bottom which is normally closed by the door 24. The door 24 effectively seals the opening in the container making it possible to maintain either a vacuum or superatmospheric pressure on the retort. When the receptacle is to be emptied the valve 23 is closed during the discharge period and re-opened when the door 24 has been closed. Continuous extraction at the desired pressure may, therefore, be carried out in the retort.

The steam and gases evolved from the drilling mud in the retort pass through the holes 25 in the shell of the retort to a manifold 26 from which they are withdrawn through the pipe 27 by the vacuum pump 28. From the vacuum pump these vapors flow through the pipe 29 to the condenser 30 where the steam is condensed. The condensate, together with the undensed gases, flows to a separator 31 in which it is separated from the gases. The valve 32 on the bottom of the separator is provided for withdrawal of the condensate. The uncondensed gases, which may be dried by any well known means, flow through the pipe 33 to an analyzer 34. Any of the known forms of analyzers or gas detectors may be used as the analyzer 34, but the hot wire gas detector, well known in the art, is preferred. The gas detector, or analyzer 34 is connected by conductors 35 and 36 to a recording meter 37 which continuously records the hydrocarobn content of the vapors and gases passing through the analyzer. A correlation can then be made between the depth from which the cuttings originated in the well bore and the hydrocarbon content of the gases carried to the surface with those cuttings.

I claim:

1. In a continuous method of the character described, the steps comprising passing a stream of drilling fluid discharged from a well drilling operation through a closed zone, heating the drilling fluid in the closed zone to a temperature above the boiling point of water and for a sufficient period of time to evolve substantially all of the fluid material entrained therein, removing solid residue from the closed zone; removing evolved vaporous material from the closed zone, cooling the evolved material by an amount sufficient to condense the water vapor therefrom, separating the condensed water from the uncondensed material, and transmitting said uncondensed material to a second closed zone wherein the presence and content of hydrocarbon material is determined.

2. In a continuous method of the character described, the steps comprising passing a stream of drilling fluid discharged from a well drilling operation through a closed zone, heating the drilling fluid in the closed zone to a temperature above the boiling point of water and for a sufficient period of time to evolve substantially all of the fluid material entrained therein, removing solid residue from the closed zone; removing evolved vaporous material from the closed zone, under subatmospheric pressure; cooling the evolved material by an amount sufficient to condense the water vapor therefrom, separating the condensed water from the uncondensed gases and passing said uncondensed gases to a second closed zone wherein the presence and content of hydrocarbon material is determined.

3. A system for continuously treating and analyzing drilling fluid discharged from a well bore in the course of a well drilling operation comprising a conduit for conveying a stream of the drilling fluid discharged from the well bore, a closed tubular retort having its central longitudinal axis inclined to the horizontal, an inlet and a pair of outlets in the lower end portion and upper end portion, respectively, of the retort, said inlet communicating with the conduit, a screw conveyor coaxially disposed within the retort, means for heating the retort to vaporize thereby fluid constituents of the drilling fluid admitted thereto, means connected to the one outlet for mainaining subamospheric pressure on the retort and for withdrawing vaporized fluid therefrom, means communicating with the last mentioned means for separating gaseous material from the vaporized fluid, means for continuously analyzing said gaseous material for the presence of combustible constituents, and a receptacle coupled to the other outlet for receiving and retaining solid residue from the retort.

4. A system for continuously treating and analyzing drilling fluid discharged from a well bore in the course of a well drilling operation comprising a conduit for conveying a stream of the drilling fluid discharged from the well bore, a closed tubular retort having its central longitudinal axis inclined to the horizontal, an inlet in the upper part of the lower end portion of the retort and communicating with the conduit, a first outlet in the upper part of the upper end portion of the retort, a second outlet in the lower part of the upper end portion of the retort, a screw conveyor coaxially disposed within the retort, means for heating the retort to vaporize thereby fluid constituents of the drilling fluid admitted thereto, means connected to the first outlet for maintaining subatmospheric pressure on the retort and for withdrawing vaporized fluid therefrom, means communicating with the last mentioned means for separating gaseous material from the vaporized fluid, means for continuously analyzing said gaseous material for the presence of combustible constituents, and a receptacle coupled to the second outlet for receiving and retaining solid residue from the retort.

5. A system for continuously treating and analyzing drilling fluid discharged from a well bore in the course of a well drilling operation comprising a conduit for conveying a stream of the drilling fluid discharged from the well bore, a closed tubular retort having its central longitudinal axis inclined to the horizontal, an inlet in the upper part of the lower end portion of the retort and communicating with the conduit, a first outlet in the upper part of the upper end portion of the retort, a second outlet in the lower part of the upper end portion of the retort, a screw conveyor coaxially disposed within the retort, means for heating the retort to vaporize thereby fluid constituents of the drilling fluid admitted thereto, means connected to the first outlet for maintaining subatmospheric pressure on the retort and for withdrawing vaporized fluid therefrom, a condenser communicating with the last mentioned means for condensing said vaporized fluid, a separator for separating uncondensed gaseous material from condensate, means for continuously analyzing said gaseous material for the presence of combustible hydrocarbons, and a receptacle coupled to the second outlet for receiving and retaining solid residue from the retort.

JAMES J. SHANLEY.